US011014557B1

(12) United States Patent
Ferguson et al.

(10) Patent No.: US 11,014,557 B1
(45) Date of Patent: May 25, 2021

(54) MODIFYING SPEED OF AN AUTONOMOUS VEHICLE BASED ON TRAFFIC CONDITIONS

(71) Applicant: Waymo LLC, Mountain View, CA (US)

(72) Inventors: David I. Ferguson, San Francisco, CA (US); Dmitri A. Dolgov, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 295 days.

(21) Appl. No.: 15/887,151

(22) Filed: Feb. 2, 2018

Related U.S. Application Data

(63) Continuation of application No. 15/173,938, filed on Jun. 6, 2016, now Pat. No. 9,932,035, which is a continuation of application No. 14/454,241, filed on Aug. 7, 2014, now Pat. No. 9,381,918, which is a continuation of application No. 13/625,238, filed on Sep. 24, 2012, now Pat. No. 8,831,813.

(51) Int. Cl.
*B60W 30/14* (2006.01)
*G05D 1/00* (2006.01)

(52) U.S. Cl.
CPC ......... *B60W 30/143* (2013.01); *G05D 1/0088* (2013.01); *B60W 2520/10* (2013.01)

(58) Field of Classification Search
None
See application file for complete search history.

(56) References Cited

U.S. PATENT DOCUMENTS

| 6,516,262 | B2 | 2/2003 | Takenaga et al. |
| 7,176,813 | B2 | 2/2007 | Kawamata et al. |
| 7,616,781 | B2* | 11/2009 | Schofield ................. H04N 7/18 382/104 |
| 7,634,339 | B2 | 12/2009 | Kudo |
| 7,706,954 | B2 | 4/2010 | Michi et al. |
| 2002/0026274 | A1* | 2/2002 | Morizane ........... B60K 31/0008 701/93 |
| 2005/0004742 | A1 | 1/2005 | Michi et al. |
| 2005/0055150 | A1 | 3/2005 | Uhler et al. |
| 2006/0224294 | A1* | 10/2006 | Kawazoe .............. B60W 30/16 701/93 |
| 2009/0037071 | A1 | 2/2009 | Inoue |
| 2009/0125203 | A1 | 5/2009 | Lindqvist et al. |
| 2009/0254260 | A1 | 10/2009 | Nix et al. |
| 2010/0082195 | A1 | 4/2010 | Lee et al. |
| 2010/0121526 | A1 | 5/2010 | Pham |
| 2010/0198450 | A1 | 8/2010 | Shin |
| 2012/0059574 | A1 | 3/2012 | Hada |

(Continued)

FOREIGN PATENT DOCUMENTS

WO 2008082403 A1 7/2008

*Primary Examiner* — Lail A Kleinman
(74) *Attorney, Agent, or Firm* — Botos Churchill IP Law

(57) ABSTRACT

Aspects of the disclosure relate generally to speed control in an autonomous vehicle. For example, an autonomous vehicle may include a user interface which allows the driver to input speed preferences. These preferences may include the maximum speed above the speed limit the user would like the autonomous vehicle to drive when other vehicles are present and driving above or below certain speeds. The other vehicles may be in adjacent or the same lane the vehicle, and need not be in front of the vehicle.

23 Claims, 11 Drawing Sheets

(56) References Cited

U.S. PATENT DOCUMENTS

| | | | |
|---|---|---|---|
| 2012/0253628 A1* | 10/2012 | Maruyama | B60W 50/085 701/93 |
| 2013/0253797 A1* | 9/2013 | McNew | B60W 30/143 701/98 |
| 2014/0067226 A1 | 3/2014 | Lee et al. | |

* cited by examiner

| Trigger Situation | Speed Preference |
|---|---|
| No vehicles traveling in the same general direction as vehicle 101 | 2% above the speed limit |
| Vehicles traveling at least 5 miles per hour above the speed limit | 3 miles per hour above the speed limit |
| Vehicles traveling at least 10 miles per hour above the speed limit | 6 miles per hour above the speed limit |
| Default (no triggering situation identified) | Speed limit for the roadway |

FIGURE 9A

| Trigger Situation | Speed Preference |
|---|---|
| No vehicles traveling in the same general direction as vehicle 101 | 2% above the speed limit |
| Vehicle traveling at least 35 miles per hour in the same general direction as vehicle 101 | 3% below the vehicle traveling at 35 miles per hour |
| Vehicle traveling at least 45 miles per hour in the same general direction as vehicle 101 | 5% below the vehicle traveling at 45 miles per hour |
| Vehicle traveling at least 55 miles per hour in the same general direction as vehicle 101 | 6% below the vehicle traveling at 55 miles per hour |
| Default (no triggering situation identified) | Speed limit for the roadway |

FIGURE 9B

MODIFYING SPEED OF AN AUTONOMOUS VEHICLE BASED ON TRAFFIC CONDITIONS

CROSS-REFERENCE TO RELATED APPLICATIONS

The present application is a continuation of U.S. patent application Ser. No. 15/173,938, filed on Jun. 6, 2016, which is a continuation of U.S. patent application Ser. No. 14/454,241, filed on Aug. 7, 2014, now U.S. Pat. No. 9,381,918, issued Jul. 5, 2016, which is a continuation of U.S. patent application Ser. No. 13/625,238, filed on Sep. 24, 2012, now U.S. Pat. No. 8,831,813, issued Sep. 9, 2014, the disclosure of which is incorporated herein by reference.

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). This detection and identification is a critical function for the safe operation of autonomous vehicle.

For example, some autonomous vehicles may use sensors to detect objects and adjust speed accordingly. For example, an autonomous vehicle may automatically (in other words, without input from a driver) slow its speed down if vehicles traveling in an adjacent lane are traveling slowly. This may mimic the behavior of a typical driver in a high-occupancy vehicle ("HOV") lane on a highway who slows his or her vehicle down when traffic in the adjacent lane is moving much slower. For example, this type of maneuver may prevent accidents when a slow moving vehicle moves into the HOV lane.

Other semi-autonomous systems using similar speed control to prevent accidents. For example, adaptive cruise control systems in a typical vehicle may allow a driver to input a maximum speed of the vehicle. If the adaptive cruise control system detects an object in the lane directly in front of the vehicle, the adaptive cruise control may slow the vehicle down to maintain a specified distance from the object. If the object speeds up or is no longer directly in front of the vehicle, the adaptive cruise control system may increase the speed of the vehicle back to the speed input by the driver.

BRIEF SUMMARY

One aspect of the disclosure provides a method. The method includes receiving, from a driver of an autonomous vehicle, input indicating a set of two or more speed preferences, where each speed preference of the set of two or more speed preferences corresponds to a different triggering situation; receiving sensor data collected as the autonomous vehicle is maneuvered along a roadway; identifying one or more objects in the autonomous vehicle's environment based on the sensor data; determining a set of objects likely to be vehicles traveling in the same general direction as the autonomous vehicle from the identified one or more objects; identifying a triggering situation based on the set of objects; identifying, by a processor, a speed preference of the set of two or more speed preferences based on the identified triggering situation; calculating, by the processor, a preferred speed based on the identified speed preference; and adjusting, by the processor, a speed of the autonomous vehicle to the preferred speed.

In one example, the set of two or more speed preferences includes a first speed preference having a maximum speed value above a speed limit for the roadway that the driver would like the autonomous vehicle to drive when other vehicles are driving at least that maximum speed value, and wherein the triggering situation is an object driving at least that maximum speed value. In another example, the set of two or more speed preferences includes a first speed preference having a first maximum speed value above a speed limit for the roadway that the driver would like the autonomous vehicle to drive when the speeds of the set of objects are less than a second maximum speed value, and the two or more speed preferences also includes a second speed preference having the second maximum speed value above the speed limit for the roadway that the driver would like the autonomous vehicle to drive when objects of the set are driving at least the second maximum speed value. In another example, identifying the triggering situation is based on a fastest speed of an object of the set of objects. In another example, identifying the triggering situation is based on an average speed of the set of objects. In another example, the set of two or more speed preferences includes a speed preference of a fixed value of speed below a speed limit for the roadway, and wherein the triggering situation for that speed preference is an object of the set of objects is traveling at least some minimum speed. In another example, at least one object of the set of objects is located behind the vehicle. In another example, calculating the preferred speed is further based on a speed limit for the roadway. In another example, the method also includes determining an estimated speed for each object of the set of objects, and identifying the speed preference is further based on the speed estimation for each object of the set of objects.

Another aspect of the disclosure provides a system. The system includes memory and a processor. The processor is configured to receive, from a driver of an autonomous vehicle, input indicating a set of two or more speed preferences, where each speed preference corresponds to a different triggering situation; store the set of two or more speed preferences in the memory; receive sensor data collected as the autonomous vehicle is maneuvered along a roadway; identify one or more objects in the autonomous vehicle's environment based on the sensor data; determine a set of objects likely to be vehicles traveling in the same general direction as the autonomous vehicle from the identified one or more objects; identify a triggering situation based on the set of objects; identify a speed preference of the set of two or more speed preferences based on the identified triggering situation; calculate a preferred speed based on the identified speed preference; and adjust a speed of the autonomous vehicle to the preferred speed.

In one example, the set of two or more speed preferences includes a first speed preference having a maximum speed value above a speed limit for the roadway that the driver would like the autonomous vehicle to drive when other vehicles are driving at least that maximum speed value, and wherein the triggering situation is an object driving at least that maximum speed value. In another example, the set of two or more speed preferences includes a first speed preference having a first maximum speed value above a speed limit for the roadway that the driver would like the autonomous vehicle to drive irrespective of the speeds of objects of the set of objects, and the two or more speed preferences also includes a second speed preference having a second maximum speed value above the speed limit for the roadway that the driver would like the autonomous vehicle to drive when objects of the set are driving at least the second maximum speed value. In another example, the processor is configured to identify the triggering situation based on a fastest speed of an object of the set of objects. In another example, the processor is configured to identify the triggering situation based on an average speed of the set of objects. In another example, the set of two or more speed preferences includes a speed preference of a fixed value of speed below a speed limit for the roadway, and wherein the triggering situation for that speed preference is that an object of the set of objects is traveling at least some minimum speed. In another example, at least one object of the set of objects is located behind the vehicle. In another example, the processor is further configured to calculate the preferred speed further based on a speed limit for the roadway. In another example, the processor is further configured to determine an estimated speed for each object of the set of objects, and the processor identifies the speed preference further based on the speed estimation for each object of the set of objects.

A further aspect of the disclosure provides a tangible computer-readable storage medium on which computer readable instructions of a program are stored. The instructions, when executed by a processor, cause the processor to perform a method. The method The method includes receiving, from a driver of an autonomous vehicle, input indicating a set of two or more speed preferences, where each speed preference of the set of two or more speed preferences corresponds to a different triggering situation; receiving sensor data collected as the autonomous vehicle is maneuvered along a roadway; identifying one or more objects in the autonomous vehicle's environment based on the sensor data; determining a set of objects likely to be vehicles traveling in the same general direction as the autonomous vehicle from the identified one or more objects; identifying a triggering situation based on the set of objects; identifying, by a processor, a speed preference of the set of two or more speed preferences based on the identified triggering situation; calculating, by the processor, a preferred speed based on the identified speed preference; and adjusting, by the processor, a speed of the autonomous vehicle to the preferred speed.

In one example, the set of two or more speed preferences includes a first speed preference having a maximum speed value above a speed limit for the roadway that the driver would like the autonomous vehicle to drive when other vehicles are driving at least that maximum speed value, and wherein the triggering situation is an object driving at least that maximum speed value. In another example, the set of two or more speed preferences includes a first speed preference having a first maximum speed value above a speed limit for the roadway that the driver would like the autonomous vehicle to drive when the speeds of the set of objects are less than a second maximum speed value, and the two or more speed preferences also includes a second speed preference having the second maximum speed value above the speed limit for the roadway that the driver would like the autonomous vehicle to drive when objects of the set are driving at least the second maximum speed value.

BRIEF DESCRIPTION OF THE DRAWINGS

FIGS. 9A and 9B are tables of triggering situations and speed preferences in accordance with aspects of the disclosure.

DETAILED DESCRIPTION

Aspects of the disclosure relate generally to controlling the speed of an autonomous vehicle according to predefined preferences of a driver. For example, a computer associated with the autonomous vehicle may receive input from a driver indicating a set of speed preferences. Each speed preference corresponds to a different triggering situation. The computer may then receive sensor data collected along a roadway. The computer may use the sensor data to identify one or more objects the autonomous vehicle's environment. Using, for example, a detailed map of the roadway as well as estimations of the characteristics of the objects from the sensor data, the computer may then determine a set of objects likely to be vehicles traveling in the same general direction as the autonomous vehicle from the identified one or more objects. These vehicles need not be traveling directly in front of vehicle the vehicle.

The computer may then use the set of objects likely to be vehicles to identify a triggering situation, for example, based on the speeds of the vehicles. The triggering situation may then be used to identify a speed preference of the set of speed preferences. The computer may calculate a preferred speed using the set of speed preferences and adjusts the speed of the autonomous vehicle to the preferred speed.

Figure 1:
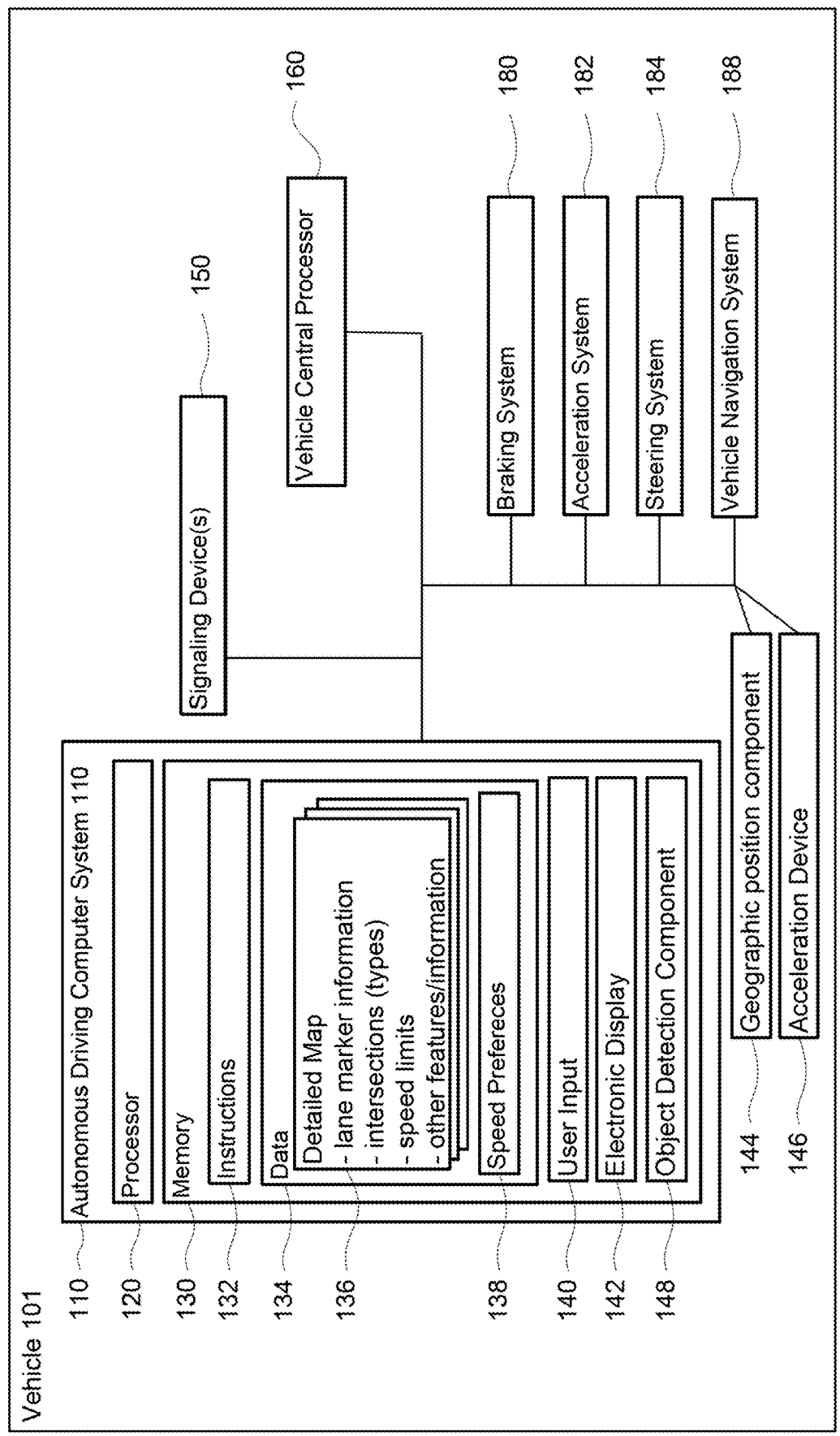
FIG. 1 is a functional diagram of a system in accordance with aspects of the disclosure.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC. Although FIG. 1 functionally illustrates the processor, memory, and other elements of computer 110 as being within the same block, it will be understood that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components, such as steering components and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle while others are executed by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
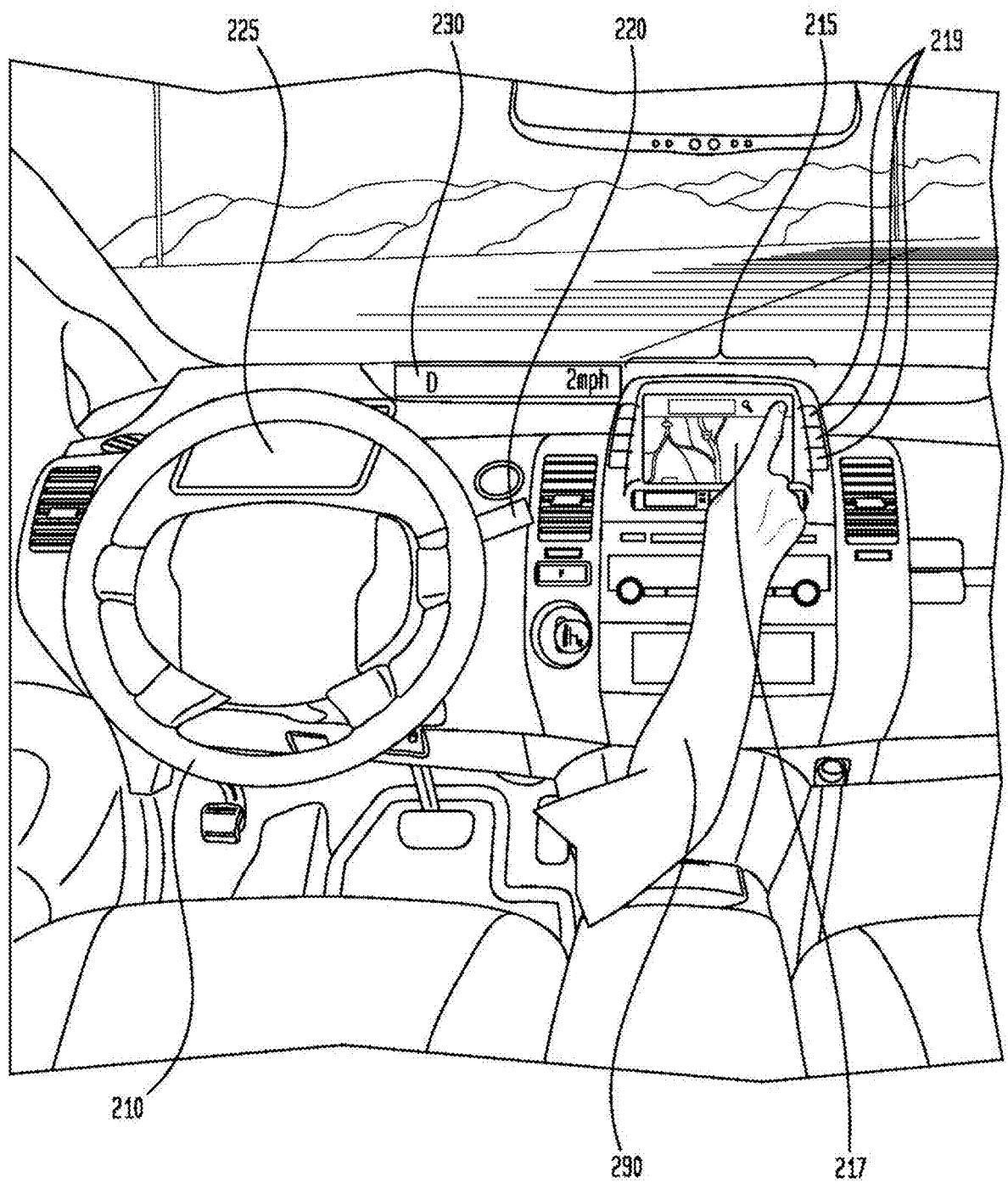
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc., of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components 148 for detecting objects and conditions external to the vehicle such as other vehicles, obstacles in the roadway, traffic signals, signs, trees, etc. The detection system may include lasers, sonar, radar detection units (such as those used for adaptive cruise control), cameras, or any other detection devices which record data which may be processed by computer 110.

Figure 3A:
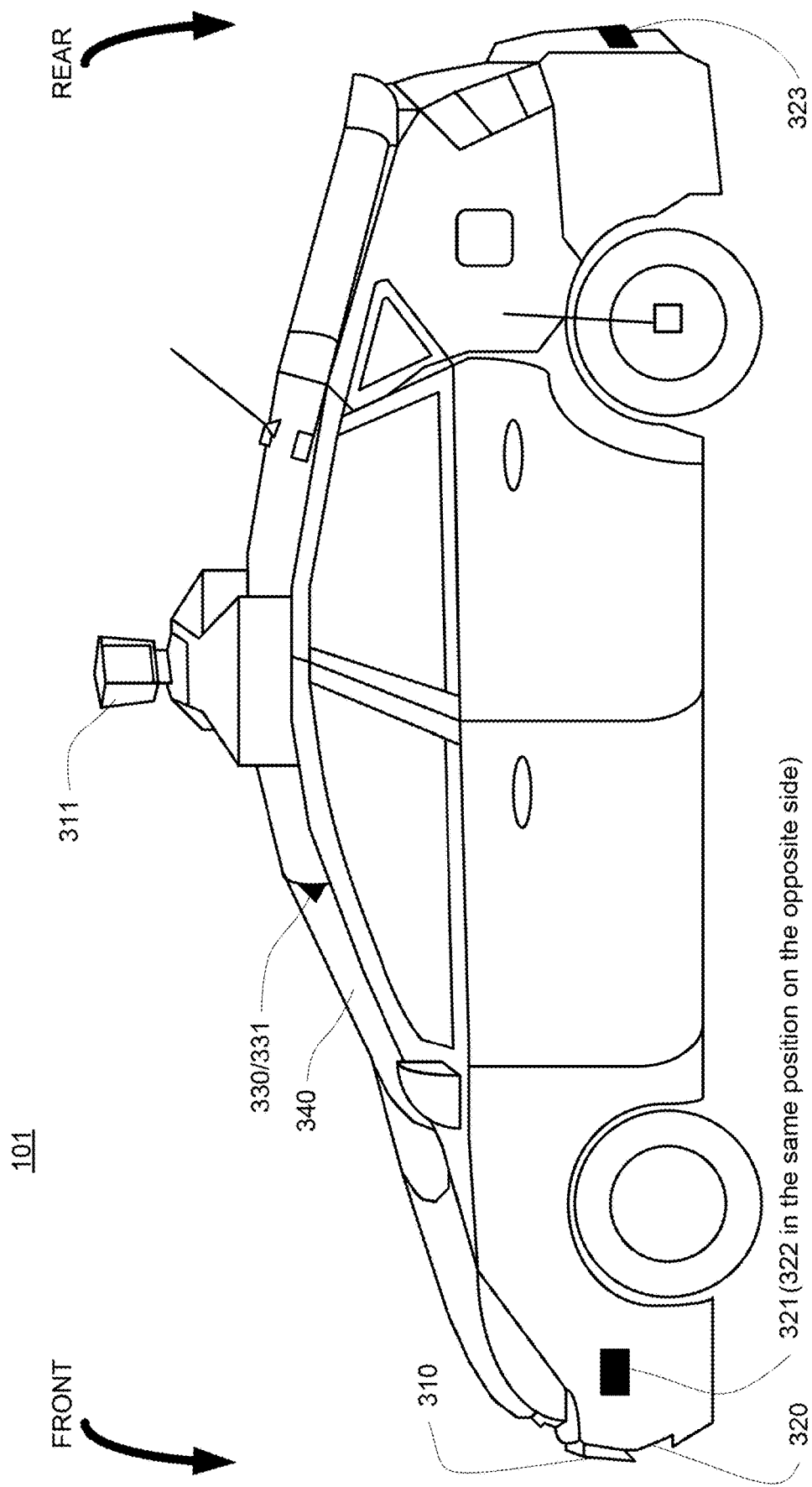
FIG. 3A is an exterior of an autonomous vehicle in accordance with aspects of the disclosure.

For example, if the vehicle is a small passenger vehicle, the car may include a laser mounted on the roof or other convenient location. In one example, shown in FIG. 3A, vehicle 101 may comprise a small passenger vehicle. In this example, vehicle 101 sensors may include lasers 310 and 311, mounted on the front and top of the vehicle, respectively. The lasers may include commercially available lasers such as the Velodyne HDL-64 or other models. The lasers may include more than one laser beam; for example, a Velodyne HDL-64 laser may include 64 beams. In one example, the beams of laser 310 may have a range of 150 meters, a thirty degree vertical field of view, and a thirty degree horizontal field of view. The beams of laser 311 may have a range of 50-80 meters, a thirty degree vertical field of view, and a 360 degree horizontal field of view. It will be understood that other lasers having different ranges and configurations may also be used. The lasers may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying various roadway features such as the shape and elevation of roadways, intersections, crosswalks, speed limits, traffic signals, buildings, signs, real time traffic information, or other such objects and information.

The detailed map information 136 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane.

In some examples, the detailed map information may include predetermined "rails" along which computer 110 may maneuver vehicle 101. These rails may therefore be associated with direction information indicative of the direction of a lane (or direction traffic should move in that lane) in which the rail appears.

Figure 4:
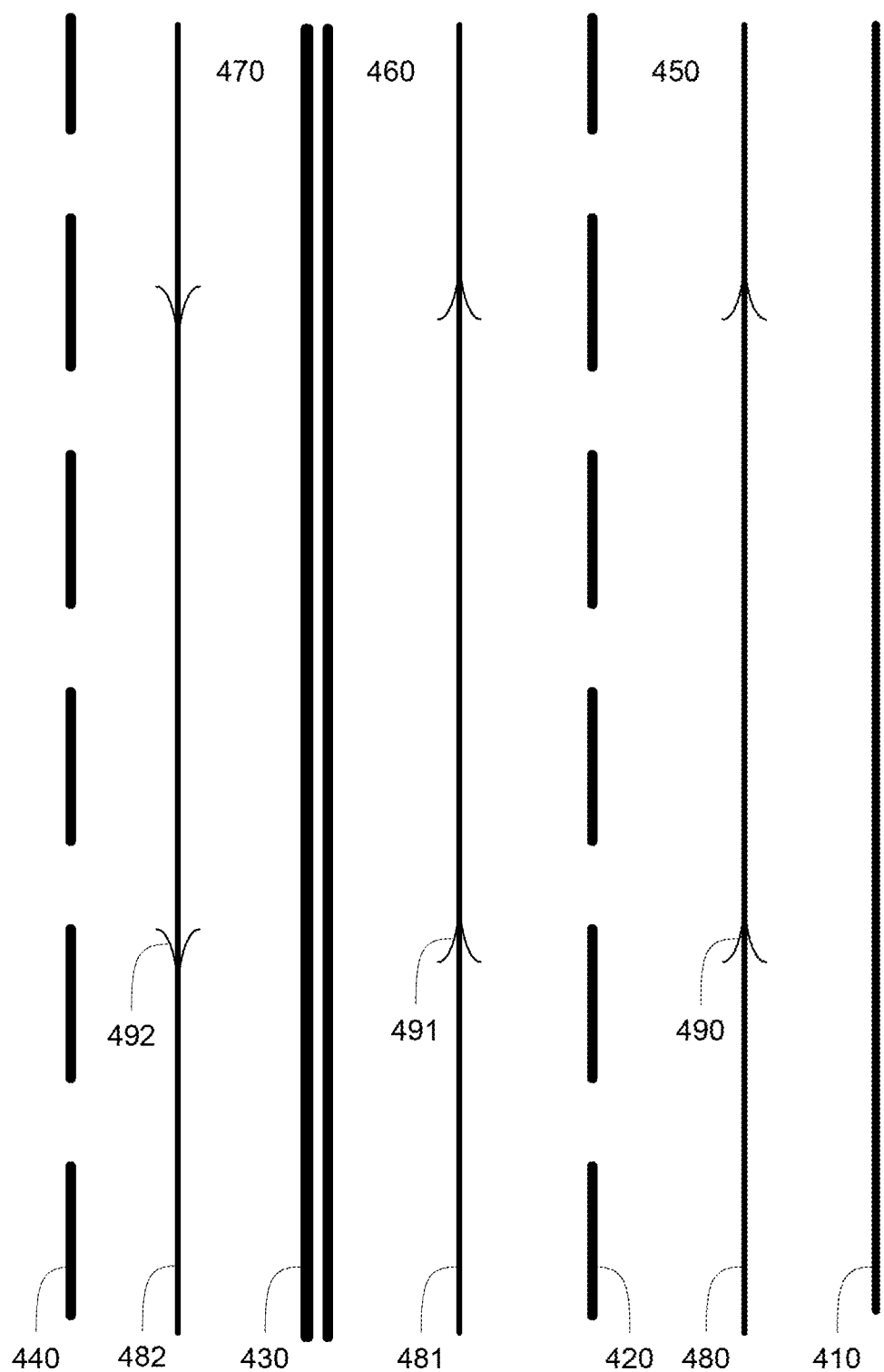
FIG. 4 is a diagram of map information in accordance with aspects of the disclosure.

FIG. 4 depicts a detailed map 400 including an example section of roadway. The detailed map of the section of roadway includes information such as solid lane line 410, broken lane lines 420, 440, and double solid lane lines 430. These lane lines define lanes 450, 460 and 470. Each lane is associated with a rail 480-82, which indicates the direction (see arrows 490-92) in which a vehicle should generally travel in the respective lane. Here, traffic in both lanes 450 and 460 flows the in the same general direction while traffic in lane 470 flows in a different general direction from lanes 450 and 460. For example, a first vehicle may follow rail 480 in the direction of arrow 490 when driving along lane 450. Similarly, a second vehicle in lane 470 would be following the direction of arrow 492 of rails 480. In this regard, the second vehicle traveling in lane 470 would be considered "opposing" traffic to the first vehicle traveling in lane 450 (and vice versa).

Again, although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 3B:
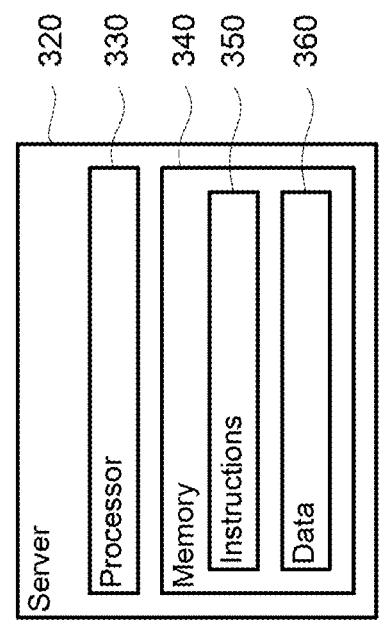
FIG. 3B is a pictorial diagram of a system in accordance with aspects of the disclosure.
Figure 3C:
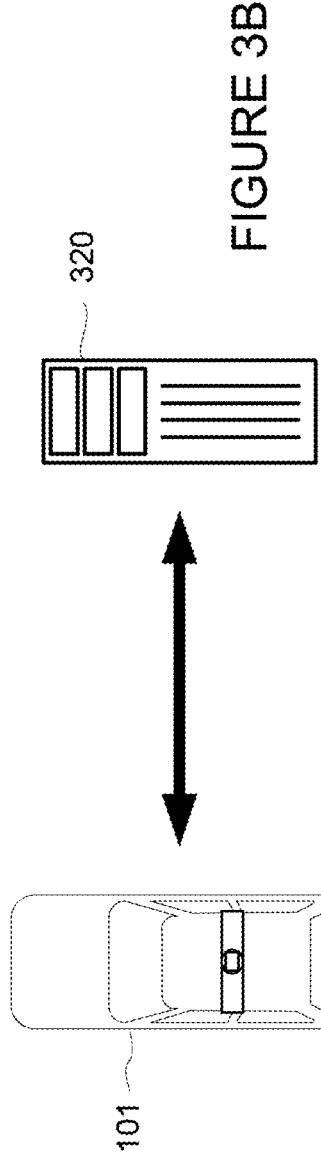
FIG. 3C is a functional diagram of a system in accordance with aspects of the disclosure.

Computer 110 may also receive or transfer information to and from other computers. For example, the map information stored by computer 110 may be received or transferred from other computers and/or the sensor data collected from the sensors of vehicle 101 may be transferred to another computer for processing as described herein. As shown in FIGS. 3B and 3C, data from computer 110 may be transmitted via a network to computer 320 for further processing. The network, and intervening nodes, may comprise various configurations and protocols including cellular networks, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 320.

In one example, computer 320 may comprise a server having a plurality of computers, e.g., a load balanced server farm, that exchange information with different nodes of a network for the purpose of receiving, processing and transmitting the data from computer 110. The server may be configured similarly to the computer 110, with a processor 330, memory 350, instructions 360, and data 370.

Returning to FIG. 1, data 134 may also include one or more speed preferences 138. As described in more detail below, a driver may designate a set of speed preferences for speed control of the vehicle. These preferences may be defined in terms of an absolute value, such as miles per hour, or as a percentage of the speed limit (stored, as noted above, as part of the detailed map 136). For example, a speed preference may specify the desired speed above/below the speed limit via a fixed amount (e.g., at most 5 mph above the speed limit) or via a percentage (e.g., at most 10% above the speed limit).

These preferences may also be associated with triggering situations. For example, a triggering situation may be the presence or absence of other vehicles and/or estimated speeds of other vehicles. In this regard, the preferences may also include a default value such as the actual speed limit, when no triggering situation is detected.

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, vehicle 101 may include a plurality of user input devices. The driver may input his or her own personal set of speed preferences using the user input devices 140 and/or touch screen 217. The user may enter the input initially before the vehicle begins driving, or while the vehicle is in motion and encountering different traffic patterns.

As noted above, a driver may input a plurality of different speeds each associated with a different triggering situation. In one example, the set of speed preferences may include different speed values for different triggering situations. For example a driver may input a maximum speed value above the speed limit the user would like the autonomous vehicle to drive in the absence of other vehicles. For example, a driver may specify that the vehicle may drive no more than 5 mph above the speed limit if there are not other vehicles on the roadway.

In another example, a driver may input a maximum speed value above the speed limit that the driver would like the autonomous vehicle to drive when other vehicles are driving at least that fast. For example, a driver may specify that the vehicle no more than drive 10 mph above the speed limit, but only if other vehicles are consistently driving more than 10 mph above the speed limit.

In addition, a driver may also input a maximum speed value above the speed limit that the driver would like the autonomous vehicle to drive regardless of the speeds of the speeds of other vehicles as well as a second maximum speed value above the speed limit that the driver would like the autonomous vehicle to drive when other vehicles are driving at least as fast as the second maximum speed value. For example, a driver may specify that the vehicle may drive no more than 5 mph above limit regardless of the speed of other vehicles, but if other vehicles are consistently driving 10 mph above the speed limit, the autonomous vehicle can increase this speed to 10 mph above the speed limit.

In yet another example, the driver may input a maximum speed value below the flow of traffic. For example, this maximum speed value may be used to keep the vehicle moving slower than other vehicles on the roadway. For example, a driver may specify that the vehicle may drive no more than 5 mph above limit if other vehicles are consistently driving more than 10 mph above the speed limit. In this regard, the autonomous vehicle would be strictly slower than at least one other vehicle.

Figure 5:
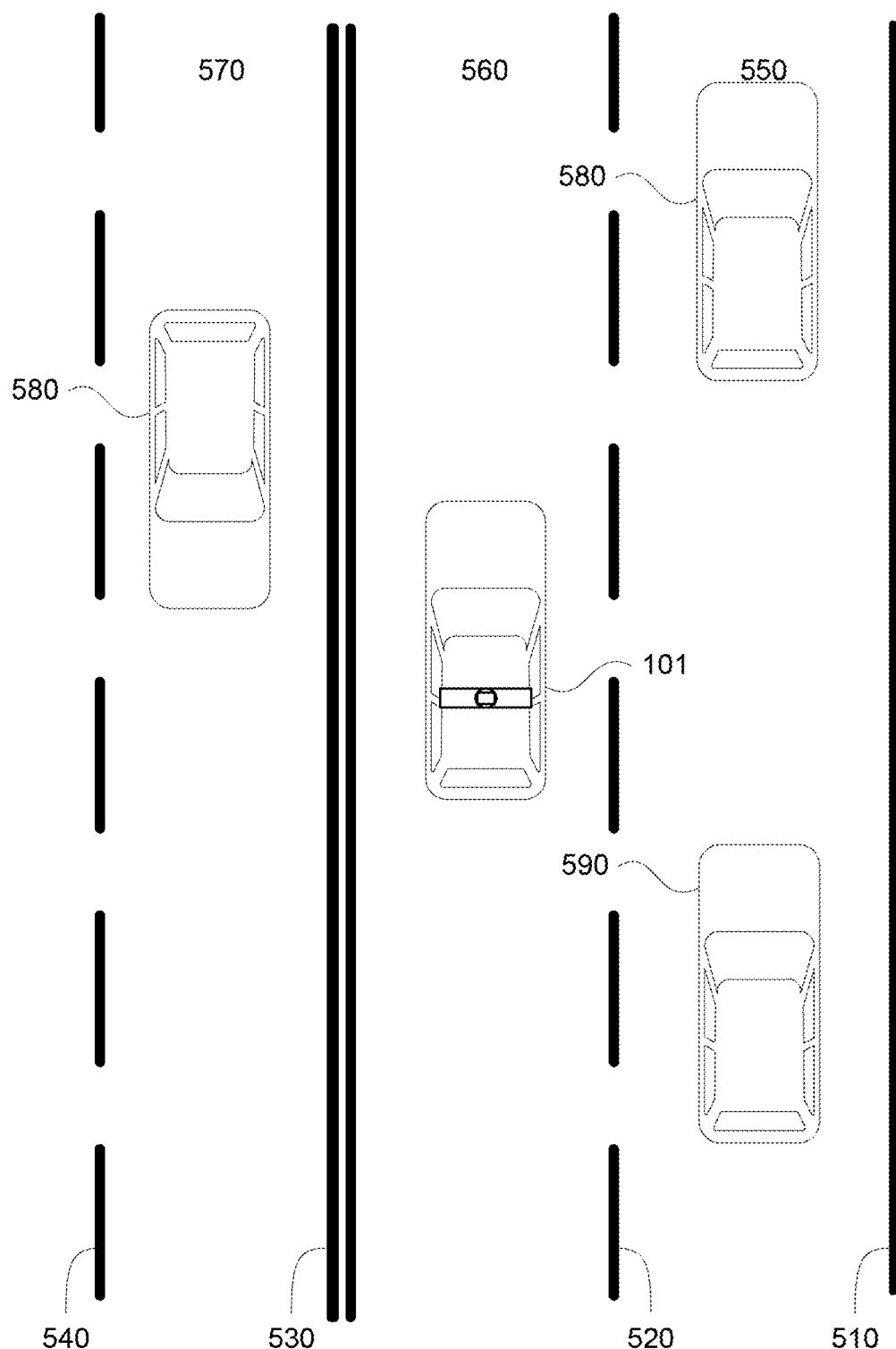
FIG. 5 is a diagram of a roadway in accordance with aspects of the disclosure.

Computer 110 may control vehicle 101 in the autonomous mode. FIG. 5 depicts vehicle 101 on a section of the roadway 500 corresponding to the detailed map information of FIG. 4. The detailed map of the section of roadway includes information such as solid lane line 510, broken lane lines 520, 540, and double solid lane lines 530. These lane lines define lanes 550, 560 and 570.

Figure 6:
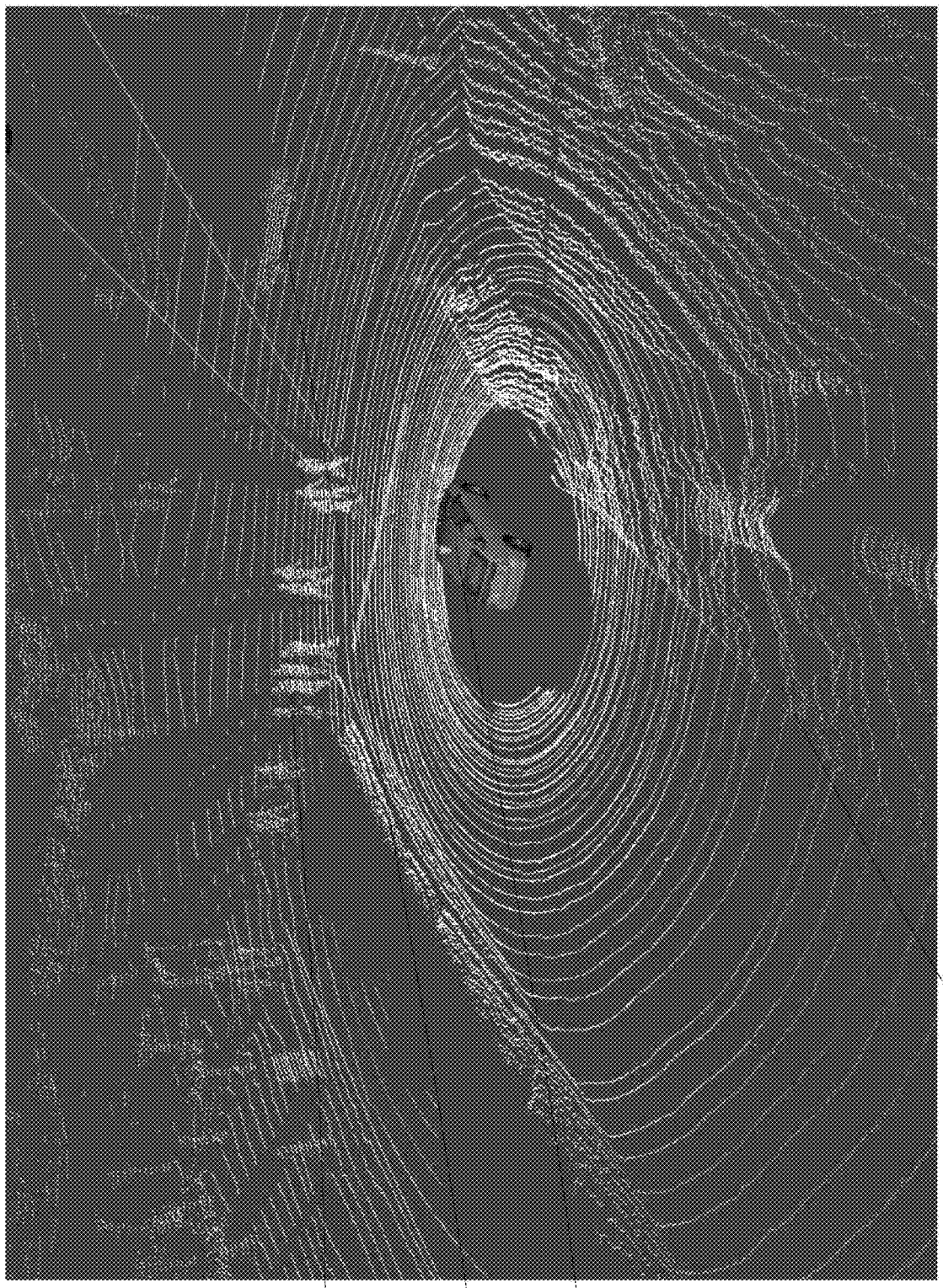
FIG. 6 is an example of laser scan data depicting a vehicle on a roadway in accordance with aspects of the disclosure.

While the vehicle is moving along a roadway, the vehicle's sensors may collect data about the vehicle's environment and send the sensor data to computer 110 for processing. For example, the sensors may include a laser such as laser 311 of FIG. 3. FIG. 6 depicts an exemplary image 600 of vehicle 101 approaching an intersection. The image was generated from laser scan data collected by the vehicle's lasers for a single 360 degree scan of the vehicle's environment. The white lines represent how the laser "sees" its environment. When the data points of a plurality of beams are considered together, the data points may indicate the shape and three-dimensional (3D) location (x,y,z) of other items in the vehicle's environment. For example, the laser scan data may indicate the outline, shape and distance from vehicle 101 of various objects such as pedestrians 610, vehicles 620, and curb 630.

Figure 7:
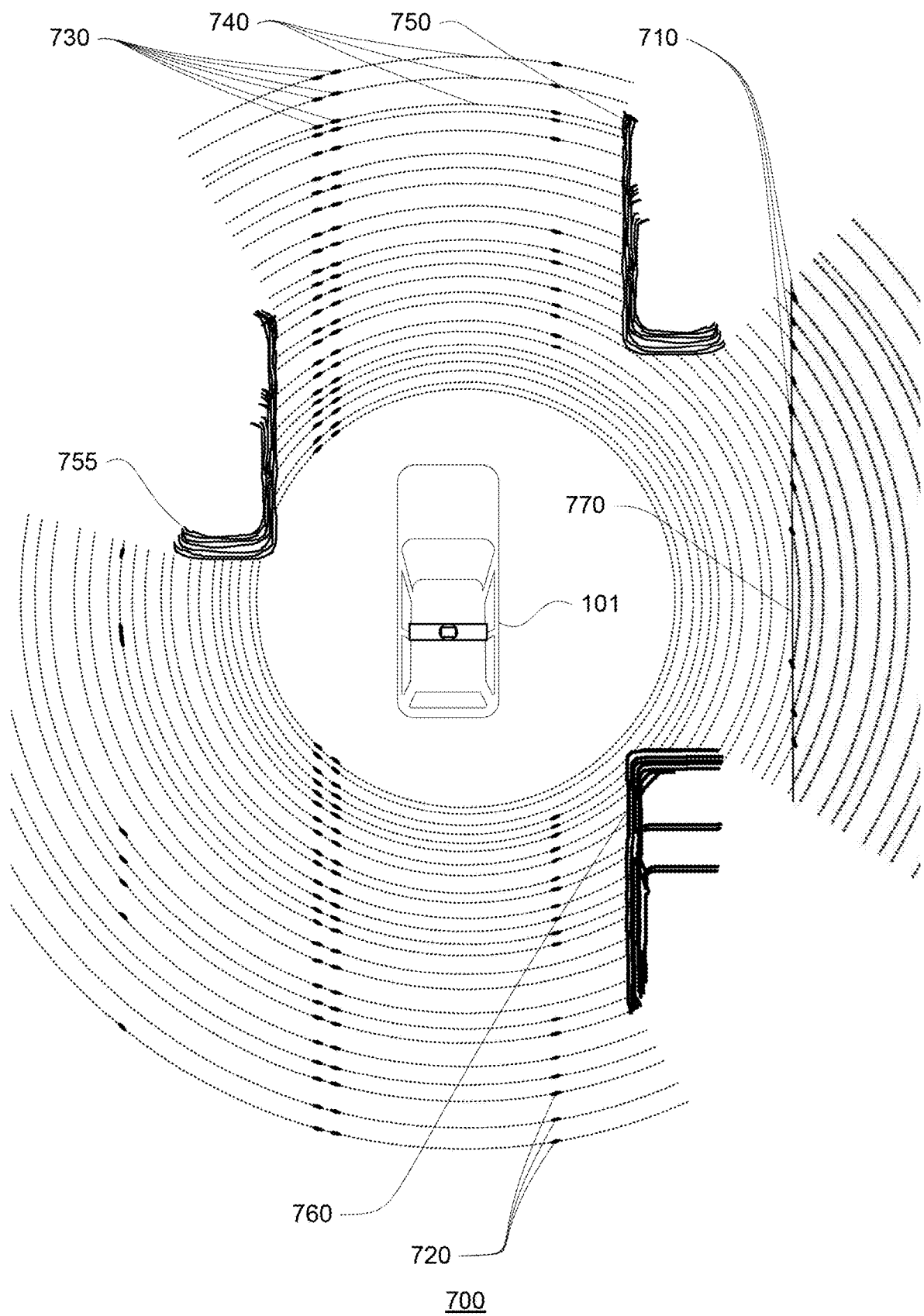
FIG. 7 is a diagram of laser scan data in accordance with aspects of the disclosure.

FIG. 7 depicts another example 700 of the laser scan data collected for a single scan. In this example, vehicle 101 is depicted driving along a section of roadway. Laser lines 730 indicate the area around the vehicle scanned by the laser. The laser lines may also indicate the shape and location other items in the vehicle's surroundings. For example, reference line 770 connects the distance and location readings 710 of the edge of the curb and is not part of the laser data. The laser data may also include indications of the distance and location of lane lines. FIG. 7 also includes distance and location readings 730 representing solid double lane lines as well as distance and location readings 720 representing broken lane lines. In this example, the data collected by the laser also includes three other vehicles that appear as disturbances 750, 755, and 760 in the laser lines 740. Disturbances 750, 755, and 760 may actually represent vehicles 580, 585, and 590 of FIG. 5.

Figure 8:
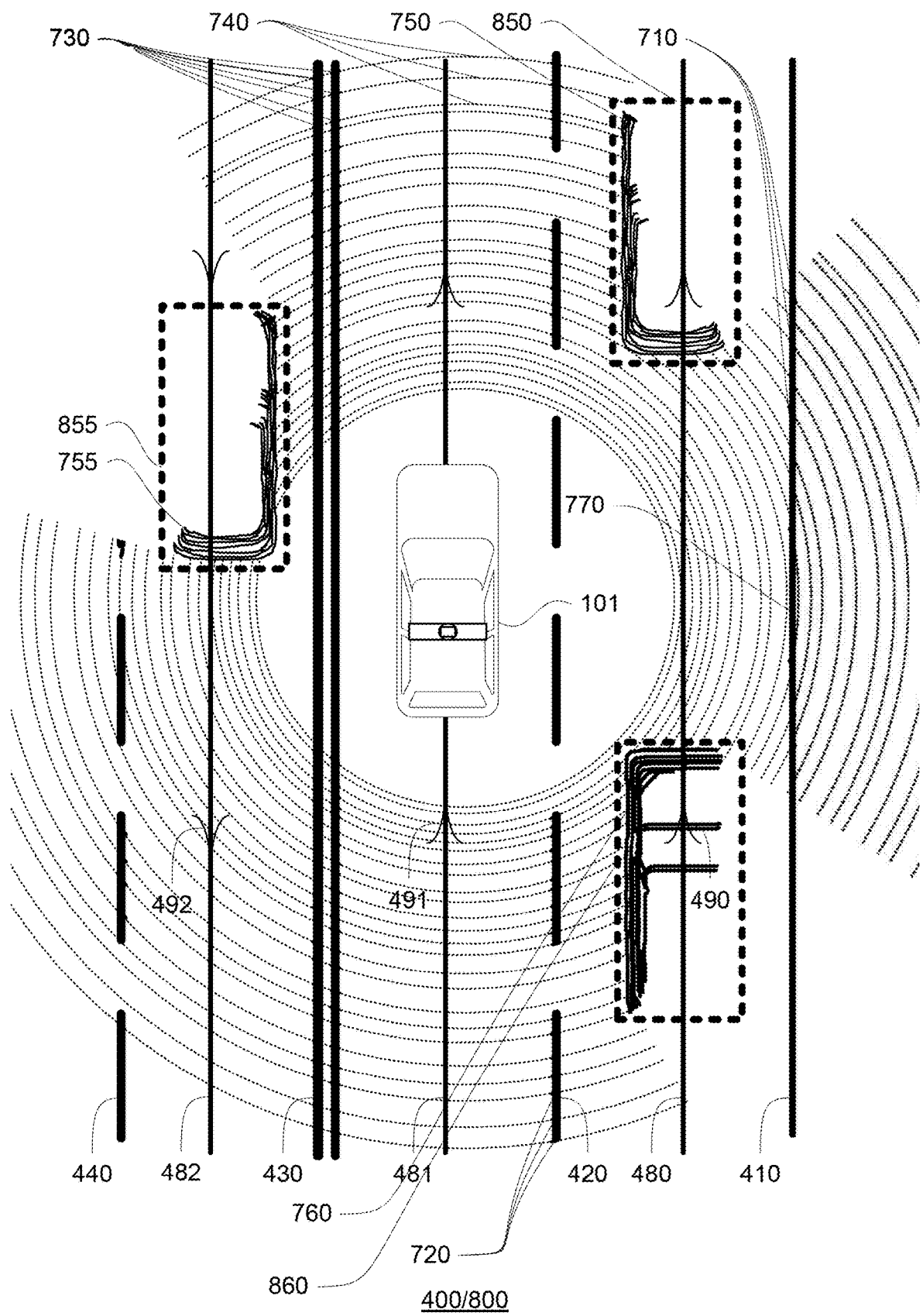
FIG. 8 is another diagram of laser scan data and detailed map information in accordance with aspects of the disclosure.

The laser scan data may be processed to identify objects in the vehicle's surroundings. For example, FIG. 8 depicts an example of both the detailed map information 400 as well as the laser scan data 700 for the section of roadway. As can be seen, the laser scan data and the detailed map correspond quite well. For example, location readings 730 correspond to the location of the double yellow lines 430 and location readings 710 correspond to the location of the white lane line 410.

In one example, objects may be identified by identifying clusters of data points from the laser scan data indicative of the outline or edges of objects. These clusters may be processed to estimate the characteristics of the particular object such as location (relative to vehicle 101, the detailed map 136, GPS latitude and longitude coordinates, or another reference) and size. In this regard, a cluster of data points which is not associated with a road feature (lane line, curb, etc.) of the detailed map information and are at least some threshold distance above the surface of the roadway may be identified as an object other than a road feature.

For example, referring to FIG. 8, vehicle 101 may identify disturbances 750 and 760 as objects 850 and 860 in the roadway which are not also included in the detailed map information. In other words, some portion of the data points associated with objects 750, 755 and 760 are located at or above a threshold distance such as 15 cm above the surface of the roadway (as indicated from detailed map 400) and do not correspond to a road feature of the detailed map information 136. In this regard, in addition to detecting objects in front of vehicle 101, the sensors may also detect objects in adjacent lanes and also behind vehicle 101. These objects may not be immediately identified as actual vehicles, but simply as objects in the roadway.

As the laser data points are collected over some period of time while vehicle 101 moves along the roadway, computer 110 may also determine whether and how the object is moving. For example, if an object was moving, the cluster of data points associated with the object would also appear to move. In this regard, computer 110 may determine the speed and approximate heading of an object. For example, computer 110 may estimate that object 860 is traveling at 55 miles per hour in a southerly direction; object 850 is traveling at 48 miles per hour in a southerly direction; and object 855 is traveling at 52 miles per hour in a northerly direction.

The approximate location of the groups of data points indicating an object in the roadway may also be used to determine a possible heading of the disturbance. For example, objects 850 and 860 are located in lane 450/550 (see FIGS. 4 and 5). Thus, the computer may assume that the objects are moving in the direction of the rail 490 of lane 450 (here, the same direction as vehicle 101). Similarly, as object 850 is located in lane 470/570 (see FIGS. 4 and 5), computer 110 may assume that the objects are moving in the direction of the rail 492. This additional heading information may be used to correct the heading determined from the laser data points and/or to predict a future location of the objects.

Computer 110 may also identify a set of objects likely to be vehicles traveling in the same general direction as vehicle 101. For example, computer 110 may identify objects that are both in the roadway and also traveling in a lane having the same heading as the lane in which vehicle 101 is traveling. Thus, objects which may not be in the same lane may also be included in the set, and objects which are generally traveling in a different direction from vehicle 101 (such as opposing traffic) may be excluded from the set. Returning to FIG. 8, both objects 850 and 860 are traveling in a lane having the same heading as the lane in which vehicle 101 is traveling. In this regard, the set of object may include both objects 850 and 860. Similarly, any objects, such as object 855, traveling in lane 470/570 (see FIGS. 4 and 5), or opposing traffic, may be excluded from this set.

Computer 110 may identify objects likely to be vehicles in various ways. For example, an object may be classified as a vehicle based on its characteristics, image matching, estimations based on characteristics determined from sensor readings, the location of the object, etc. This may include classifying objects based on an object type models or machine learning classifiers that output a possible object type and corresponding possibilities based on the determined characteristics for that object. In an example model, an object's type may be identified based on its location with respect to a roadway, its speed, its size, its comparison to sensor data collected by other pre-identified object (such as by image matching), etc. For example, given an object, such as object 850, that is perceived to be about 69 inches wide, 59 inches high, and 177 includes long, an object type model may output information indicating that the object is 0.5% likely to be a pedestrian, 2.5% likely to be a bicyclist and 97% likely to be a vehicle.

In one example, the set of objects likely to be vehicles traveling in the same general direction as vehicle 101 may be empty if there are no other vehicles on the roadway (or if there are no other vehicles which are not opposing traffic). Computer 110 may use this triggering situation to identify a speed preference of the set of speed preferences for the driver. For example, returning to FIG. 8, if objects 850 and 860 were not present, computer 110 may determine that object 855 is not include in the set of objects likely to be vehicles traveling in the same general direction as vehicle 101, and accordingly, that the set is empty. In this example, computer 110 may identify the corresponding speed preference for the trigger situation where the set is empty. Tables 910 and 920 of FIG. 9A or 9B, are examples of sets of speed preferences for different drivers. Using the triggering situation of an empty set, computer 110 may identify a maximum speed value above the speed limit the user would like the autonomous vehicle to drive in the absence of other vehicles of 2% above the speed limit. As noted above, this maximum speed value may be a percentage of the speed limit or a fixed number of miles per hour.

Computer 110 may then use the identified speed preference to adjust or otherwise control the speed of vehicle 101. For example, using the maximum speed value above the speed limit the user would like the autonomous vehicle to drive in the absence of other vehicles (see tables 910 or 920) as well as the speed limit data from the detailed map information 136 for roadway 500, computer may calculate a preferred speed. Computer 110 may then adjust the speed of the vehicle to correspond to the preferred speed. Assuming the driver has input a maximum speed value above the speed limit the user would like the autonomous vehicle to drive in the absence of other vehicles of 2% and computer 110 identifies that the speed limit of the roadway 500 is 50 miles per hour, computer 110 may calculate a preferred speed of 51 miles per hour (50 miles per hour×1.02). Computer 110 may then automatically adjust the speed of vehicle 101 to 51 miles per hour.

Alternatively, if the set of objects likely to be vehicles traveling the same general direction as vehicle 101 includes at least one object, computer 110 may use the estimated speed of the object or objects of the set to determine a triggering situation and also a speed preference of the set of speed preferences. For example, computer 110 may determine the speeds of each vehicle of the set of objects and use the speed of the fastest moving object to determine a triggering situation and a speed preference. Alternatively, computer 110 may compute an average speed of the objects the set or use some other statistical calculation to determine a combined speed value for all of the objects in the set. For example, computer 100 may compute the average speed of vehicles in a lane, the average speed of vehicles in front of (down the road from) the vehicle 101 in a lane, the minimum speed (the slowest vehicle), the maximum speed (the fastest vehicle), a filtered average speed removing outliers (extreme fast or slow vehicles relative to the average), etc. This combined speed value may then be used to determine a triggering situation and a speed preference.

Returning to the example of FIG. 8, the set of objects includes objects 850 and 860. Computer 110 has determined that object 850 is traveling at 55 miles per hour, object 860 is traveling at 48 miles per hour, and the speed limit of roadway 500 is 50 miles per hour. If a triggering situation is that objects in the set are traveling at least 5 miles per hour above the speed limit or at least 55 miles per hour, because object 850 is traveling at 55 miles per hour, computer 110 may use this information to identify a speed preference for this particular triggering situation. Referring to the example of FIG. 9A, computer may identify a maximum speed value of 3 miles per hour above the speed limit when other vehicles are driving at least 55 miles per hour (5 miles per hour above the speed limit). As noted above, this maximum speed value may be a percentage of the speed limit or a fixed number of miles per hour.

Again, computer 110 may then use the identified speed preference to adjust or otherwise control the speed of vehicle 101. For example, assuming the driver has input a maximum speed value above the speed limit of 3 miles per hour when other vehicles are driving at least 5 miles per hour over the speed limit, computer 110 may calculate a preferred speed of 53 miles per hour (50 miles per hour+3 miles per hour). Computer 110 may then automatically adjust the speed of vehicle 101 to 53 miles per hour.

In another example of table 920 of FIG. 9B, because object 850 is traveling at 55 miles per hour, computer may use this information to identify a speed preference for this particular triggering situation. In this example, computer 110 may use this to identify a maximum speed value of 6% below the speed of the vehicle traveling at least 55 miles per hour. Again, this maximum speed value may be a percentage of the speed limit or a fixed number of miles per hour.

As noted above, computer 110 may then use the identified speed preference to adjust or otherwise control the speed of vehicle 101. For example, assuming the driver has input a minimum speed deviation below the flow of traffic of 3 miles per hour when other vehicles are driving at least 55 miles per hour, computer 110 may calculate a preferred speed of 52 miles per hour (55 miles per hour–3 miles per hour). Computer 110 may then automatically adjust the speed of vehicle 101 to 52 miles per hour.

In yet another example, if no other triggering situations are identified, computer 110 may refer to a default speed preference. For example, as shown in both tables 910 and 920, if no particular triggering situations are identified, the default speed value is the speed limit of the roadway. In this regard, computer 110 may adjust the speed of vehicle 101 to match the speed limit for roadway 500, here 50 miles per hour.

Figure 10:
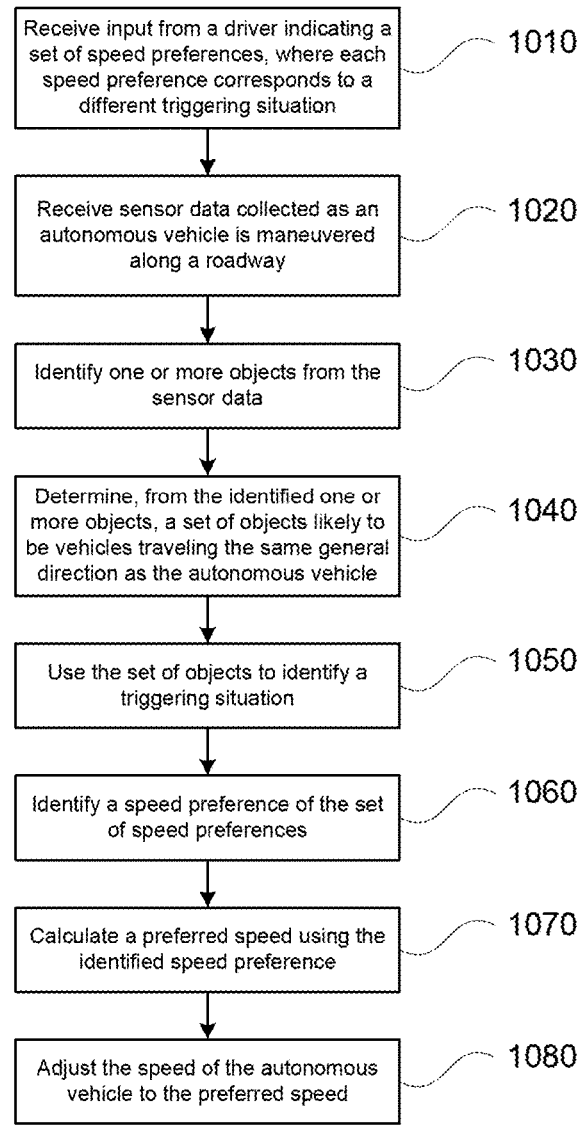
FIG. 10 is a flow diagram in accordance with aspects of the disclosure.

Flow diagram 1000 of FIG. 10 is an example of some of the aspects described above as performed by computer 101. For example, at block 1010, computer 110 receives input from a driver indicating a set of speed preferences, where each speed preference corresponds to a different triggering situation. The computer receives sensor data collected as the autonomous vehicle is maneuvered by the computer along a roadway at block 1020. The computer may use the sensor data to identify one or more objects the vehicle's environment at block 1030. Using, for example, a detailed map of the roadway as well as estimations of the characteristics of the objects from the sensor data, computer 110 then determines a set of objects likely to be vehicles traveling in the same general direction as the autonomous vehicle from the identified one or more objects at block 1040. As noted above, these vehicles need not be traveling directly in front of vehicle the vehicle.

Computer 110 uses the set of objects likely to be vehicles to identify a triggering situation, for example, based on the speeds of the vehicles at block 1050. The identified triggering situation is used to identify a speed preference of the set of speed preferences at block 1060. The computer calculates a preferred speed using the identified speed preference and adjusts the speed of the autonomous vehicle to the preferred speed at blocks 1070 and 1080, respectively.

Different drivers may want the vehicles to drive at different speeds and thus, may input individualized speed preferences. For example, some people may only want to travel faster than the speed limit if there are other vehicles are doing this, and will want to stay below (or at most at) the speed of other vehicles, to match the flow of traffic. This allows for more aggressive driving which is relatively conservative as to other vehicles. Allowing drivers to specify their preferences as described herein is important to keeping them happy and relaxed. For example, some drivers may assume that they are safer if they keep up with the speed of traffic and, if traveling above the speed limit, less likely to be pulled over when other vehicles are traveling at least as fast.

By using a set of speed preferences, computer 110 may provide a driver with a more natural driving experience in the vehicle 101. For example, computer 110 may use the set of speed preferences to automatically adapt to the general flow of traffic in such a way that is both expected and pleasing to a particular driver. In addition, the driver does not need to constantly engage and disengage a cruise control or adjust the speed of the cruise control when driving. These functions may be performed automatically by computer 110.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:
1. A first vehicle, comprising:
one or more computing devices having one or more processors, the one or more processors being configured to:

identify a driver preference for speed control of the first vehicle based on a vehicle characteristic and a percentage of a posted speed limit,
receive, from a sensor system of the first vehicle, information identifying a second vehicle;
determine that the second vehicle has the vehicle characteristic using the information identifying the second vehicle; and
based on the determination, control the first vehicle in an autonomous driving mode according to the driver preference.

2. The first vehicle of claim 1, wherein the one or more processors are further configured to adjust a speed of the first vehicle to a percentage above the posted speed limit.

3. The first vehicle of claim 2, wherein the vehicle characteristic includes a location of the second vehicle.

4. The first vehicle of claim 3, wherein the driver preference is adjusted based on whether no other vehicles are traveling in a same direction as the first vehicle.

5. The first vehicle of claim 3, wherein the driver preference is adjusted based on whether the second vehicle is driving in a lane having a same heading as a lane in which the first vehicle is currently traveling.

6. The first vehicle of claim 1, wherein when the driver preference is based on a percentage of a speed of the second vehicle, the one or more processors are further configured to adjust the speed of the first vehicle to be a percentage below the speed of the second vehicle.

7. The first vehicle of claim 1, wherein the driver preference is based on a fixed speed value, and
wherein the one or more processors are configured to compare the driver preference with the posted speed limit, and adjust a speed of the first vehicle to be less than a speed that the second vehicle drives above the posted speed limit.

8. The first vehicle of claim 1, wherein the vehicle characteristic is a speed of the second vehicle.

9. A method comprising:
identifying, by one or more processors, a driver preference for speed control of a first vehicle based on a vehicle characteristic and a percentage of a posted speed limit,
receiving, by the one or more processors, from a sensor system of the first vehicle, information identifying a second vehicle;
determining, by the one or more processors, that the second vehicle has the vehicle characteristic using the information identifying the second vehicle; and
based on the determination, controlling the first vehicle, by the one or more processors, in an autonomous driving mode according to the driver preference.

10. The method of claim 9, wherein the method further comprises adjusting a speed of the first vehicle to a percentage above the posted speed limit based on the vehicle characteristic.

11. The method of claim 10, wherein the vehicle characteristic includes a location of the second vehicle.

12. The method of claim 11, wherein the driver preference is adjusted based on whether no other vehicles are traveling in a same direction as the first vehicle.

13. The method of claim 11, wherein the driver preference is adjusted based on whether another vehicle is driving in a lane having a same heading as a lane in which the first vehicle is currently traveling.

14. The method of claim 9, further comprising:
when the driver preference is based on a percentage of a speed of the second vehicle, adjusting the speed of the first vehicle by a percentage below the speed of the second vehicle.

15. The method of claim 9, wherein the driver preference is based on a fixed speed value, the method further comprising:
comparing the driver preference with the posted speed limit; and
adjusting a speed of the first vehicle to be less than a speed that the second vehicle drives above the posted speed limit.

16. The method of claim 9, wherein the vehicle characteristic is a speed of the second vehicle.

17. A non-transitory, computer readable medium on which instructions are stored, the instructions, when executed by one or more processors, cause the one or more processors to perform a method, the method comprising:
identifying a driver preference for speed control of a first vehicle based on a vehicle characteristics and a percentage of a posted speed limit,
receiving from a sensor system of the first vehicle, information identifying a second vehicle;
determining that the second vehicle has a vehicle characteristic using the information identifying the second vehicle; and
based on the determination, controlling the first vehicle in an autonomous driving mode according to the driver preference.

18. The medium of claim 17, wherein the vehicle characteristic includes a speed of the second vehicle.

19. The medium of claim 17, wherein the method further comprises:
when the driver preference is based on a percentage of a speed of the second vehicle, adjusting the speed of the first vehicle by a percentage below the speed of the second vehicle.

20. The medium of claim 17, wherein the driver preference is based on a fixed speed value, the method further comprising:
comparing the driver preference with the posted speed limit; and
adjusting a speed of the first vehicle to be less than a speed that the second vehicle drives above the posted speed limit.

21. The first vehicle of claim 1, wherein the one or more processors are further configured to receive a user input including at least one of the percentage of the posted speed limit or the vehicle characteristic.

22. The method of claim 9, further comprising receiving a user input including at least one of the percentage of the posted speed limit or the vehicle characteristic.

23. The medium of claim 17, wherein the method further comprises receiving a user input including at least one of the percentage of the posted speed limit or the vehicle characteristic.

* * * * *